United States Patent
Dallerup Rasmussen et al.

(10) Patent No.: US 12,461,116 B2
(45) Date of Patent: Nov. 4, 2025

(54) CONTROL UNIT AND A LIQUID CONTAINER INSERTABLE IN A MILK ANALYSIS APPARATUS

(71) Applicant: DELAVAL HOLDING AB, Tumba (SE)

(72) Inventors: Claus Dallerup Rasmussen, Tumba (SE); John Slaaby, Tumba (SE)

(73) Assignee: DeLaval Holding AB, Tumba (SE)

( * ) Notice: Subject to any disclaimer, the term of this patent is extended or adjusted under 35 U.S.C. 154(b) by 469 days.

(21) Appl. No.: 17/618,812

(22) PCT Filed: Jun. 9, 2020

(86) PCT No.: PCT/SE2020/050585
§ 371 (c)(1),
(2) Date: Dec. 13, 2021

(87) PCT Pub. No.: WO2020/251459
PCT Pub. Date: Dec. 17, 2020

(65) Prior Publication Data
US 2022/0232797 A1    Jul. 28, 2022

(30) Foreign Application Priority Data
Jun. 14, 2019    (SE) .................................. 1950718-5

(51) Int. Cl.
*G01N 35/00* (2006.01)
*A01J 5/013* (2006.01)
*G01N 33/04* (2006.01)

(52) U.S. Cl.
CPC ...... *G01N 35/00722* (2013.01); *A01J 5/0131* (2013.01); *G01N 33/04* (2013.01)

(58) Field of Classification Search
CPC .......................... G01N 35/00722; G01N 33/04
(Continued)

(56) References Cited

U.S. PATENT DOCUMENTS 5,996,529 A * 12/1999 Sissom ..................... A01J 5/01
119/14.14
8,072,596 B2 * 12/2011 Katz ................... G01N 21/359
119/14.01
(Continued)

FOREIGN PATENT DOCUMENTS

CN    202230092 U    5/2012
CN    103675248 A    3/2014
(Continued)

OTHER PUBLICATIONS

International Search Report for PCT/SE2020/050585 mailed Oct. 9, 2020, 4 pages.
(Continued)

*Primary Examiner* — Peter J Macchiarolo
*Assistant Examiner* — Rodney T Frank
(74) *Attorney, Agent, or Firm* — NIXON & VANDERHYE

(57) ABSTRACT

A control unit (240) and liquid container (135) of a milk analysis apparatus (120) having a first wireless communication device (210), for communication with a memory device (230) of a liquid container (135). The liquid container (135) is insertable into the milk analysis apparatus, via a second wireless communication device (220) in the liquid container. The control unit (240) is configured to obtain a signal associated with consumed liquid amount of the liquid container, during a liquid extraction session; and transmit information related to the consumed liquid amount via the first wireless communication device, for storage in the memory device of the liquid container.

13 Claims, 3 Drawing Sheets

(58) Field of Classification Search
USPC .......................................................... 73/53.01
See application file for complete search history.

(56) References Cited

U.S. PATENT DOCUMENTS

| | | | |
|---|---|---|---|
| 9,051,163 B2 | 6/2015 | Mehus et al. | |
| 11,866,314 B2* | 1/2024 | Lyons | B67D 1/1231 |
| 2005/0003522 A1* | 1/2005 | Carlsen | B01L 9/52 |
| | | | 702/19 |
| 2005/0179756 A1 | 8/2005 | Hatasa et al. | |
| 2005/0277912 A1* | 12/2005 | John | A61M 5/16827 |
| | | | 604/890.1 |
| 2006/0255138 A1 | 11/2006 | Chang | |
| 2008/0003564 A1* | 1/2008 | Chen | B01L 3/502 |
| | | | 435/5 |
| 2012/0216748 A1* | 8/2012 | Hofman | A01K 1/126 |
| | | | 119/14.08 |
| 2012/0226451 A1 | 9/2012 | Bacot et al. | |
| 2013/0025540 A1* | 1/2013 | Axelson | A01J 5/0132 |
| | | | 119/14.08 |
| 2013/0025541 A1* | 1/2013 | Axelson | A01J 5/007 |
| | | | 119/14.08 |
| 2013/0248695 A1* | 9/2013 | Macintyre | G01N 21/253 |
| | | | 250/216 |
| 2015/0032253 A1 | 1/2015 | O'Dougherty et al. | |
| 2015/0044096 A1 | 2/2015 | Nakasawa | |
| 2016/0257554 A1* | 9/2016 | Manwani | B65D 23/02 |
| 2018/0132511 A1* | 5/2018 | Heringlehner | B65D 83/7713 |
| 2018/0181906 A1* | 6/2018 | Baduge | G06Q 10/087 |
| 2018/0361040 A1* | 12/2018 | O'Toole | A61M 1/062 |
| 2019/0147202 A1* | 5/2019 | Harney | H04L 41/0809 |
| | | | 235/375 |
| 2019/0227090 A1 | 7/2019 | Sasaki | |
| 2019/0327933 A1* | 10/2019 | Svahn | A01K 1/12 |
| 2020/0078503 A1* | 3/2020 | Bartlett | A61M 1/062 |
| 2022/0240479 A1* | 8/2022 | Dallerup Rasmussen | A01J 5/007 |
| 2022/0295734 A1* | 9/2022 | Dallerup Rasmussen | G01N 35/00871 |

FOREIGN PATENT DOCUMENTS

| | | | | |
|---|---|---|---|---|
| CN | 104849130 A | 8/2015 | | |
| CN | 204 837 419 | 12/2015 | | |
| CN | 107328948 A | 11/2017 | | |
| GB | 2 429 694 | 1/2008 | | |
| JP | H01105165 A | 4/1989 | | |
| JP | 2017041261 A | 2/2017 | | |
| JP | 2019066426 A | 4/2019 | | |
| WO | 2012015809 A2 | 2/2012 | | |
| WO | WO-2015001540 A1 * | 1/2015 | | A01J 5/007 |
| WO | 2018051672 A1 | 3/2018 | | |
| WO | 2018/198103 | 11/2018 | | |
| WO | 2018/236271 | 12/2018 | | |
| WO | 2018236272 A1 | 12/2018 | | |

OTHER PUBLICATIONS

Written Opinion of the ISA for PCT/SE2020/050585 mailed Oct. 9, 2020, 5 pages.
Swedish Search Report for SE1950718-5 dated Feb. 25, 2020, 2 pages.
Office Action, issued in Japanese Patent Application No. 2021-573801 dated Feb. 20, 2024.
Office Action, issued in Chinese Patent Application No. 202080042232.7 dated Nov. 23, 2024.

* cited by examiner

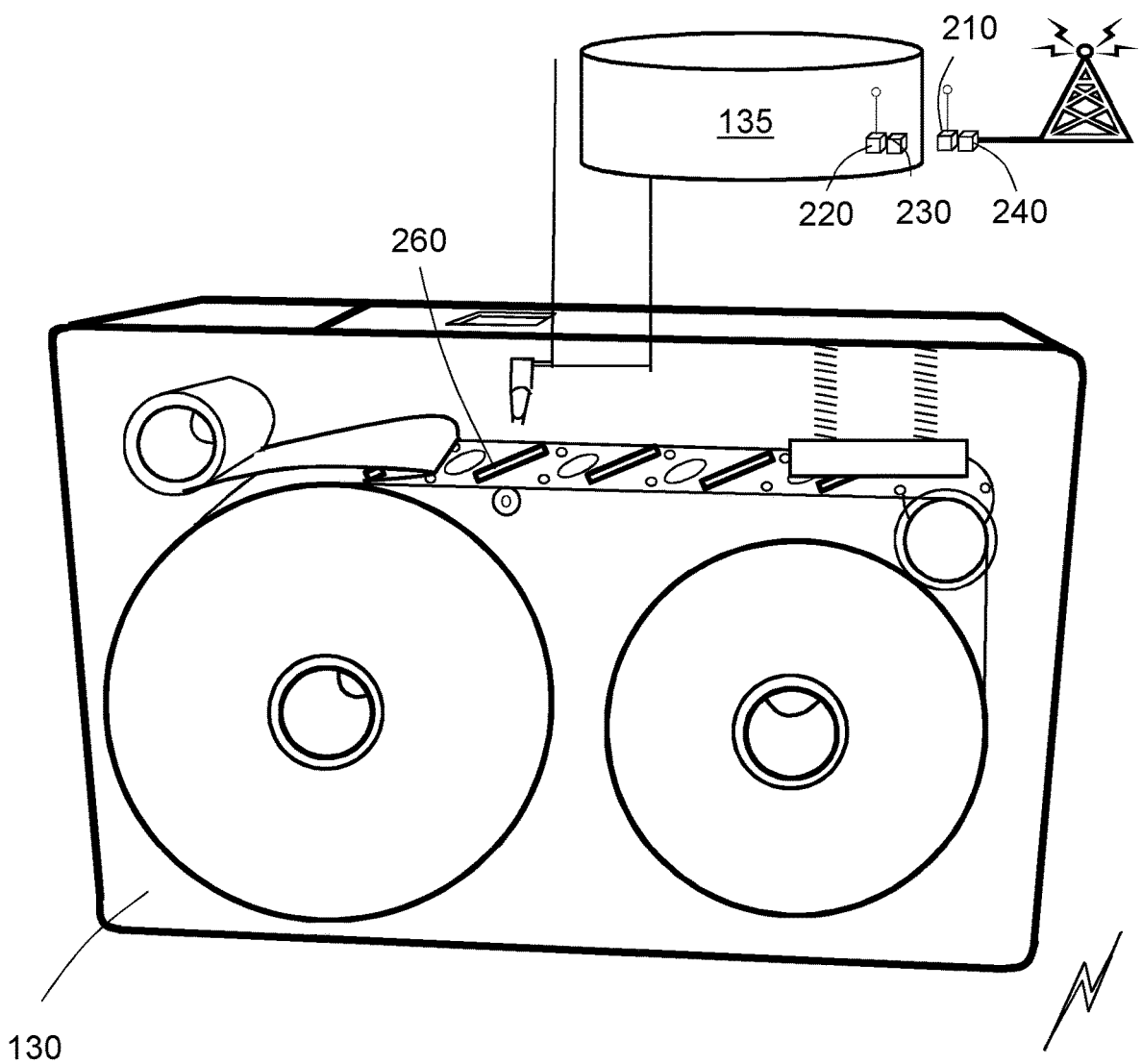
Fig. 3
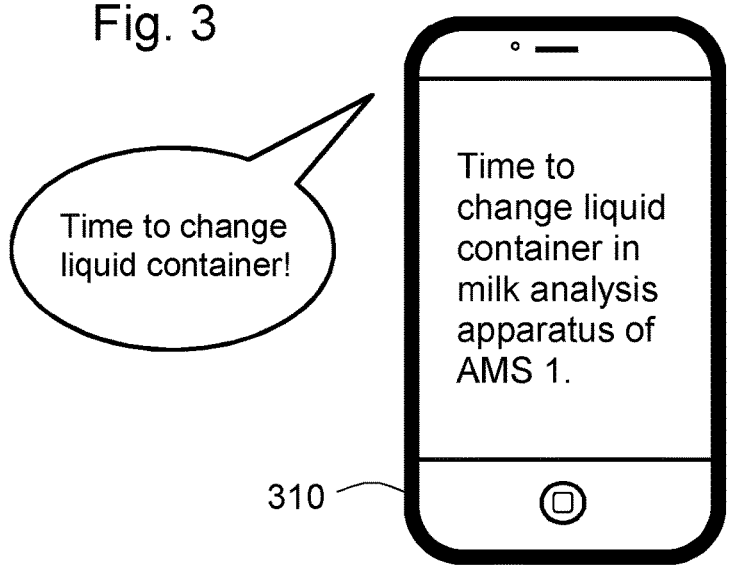

CONTROL UNIT AND A LIQUID CONTAINER INSERTABLE IN A MILK ANALYSIS APPARATUS

This application is the U.S. national phase of International Application No. PCT/SE2020/050585 filed Jun. 9, 2020 which designated the U.S. and claims priority to SE Patent Application No. 1950718-5 filed Jun. 14, 2019, the entire contents of each of which are hereby incorporated by reference.

TECHNICAL FIELD

This document discloses a liquid container, insertable into a milk analysis apparatus, and a control unit of the milk analysis apparatus. More particularly, it is herein presented a control unit of a milk analysis apparatus comprising a first wireless communication device, for communication with a memory device of the liquid container, which liquid container is insertable into the milk analysis apparatus, via a second wireless communication device comprised in the liquid container.

BACKGROUND

On an animal farm, it is important to keep the animals healthy in order to enhance milk/meat production, and/or to monitor when animals are in heat and/or pregnant, for example. It is important to inseminate animals at an optimal moment in order to successfully fertilise the animal. In case the animal is not successfully inseminated, milk production is affected.

Several biomarker measurements may be made on the animal, such as e.g. measuring levels of progesterone, LDH (Lactate Dehydrogenase), BHB (Beta-Hydroxybutyrat) and urea. Thereby important information concerning e.g. heat detection and/or pregnancy of the individual animal may be made (based on measured progesterone level), as well as mastitis (based on LDH) and ketosis (based on BHB). Also, the energy balance of the animal may be estimated (based on urea).

Thereby, a farmer/operator is provided with important information concerning status of each individual animal. However, to perform and analyse biomarker measurements of all individual animals at a farm, e.g. by applying milk samples on prepared dry sticks, and analyse these samples are time consuming for the farmer, who may have to take care of various other important issues. It also put high demands on administrative skills on the farmer to distinguish biomarker measurements from different animals; to keep track on when it is time to repeat the biomarker measurement for each individual animal and when to change biomarker measurement units; maintenance of the biomarker test equipment as well as high demands on cleanliness for not allowing a biomarker measurement of a first animal to be contaminated by biological matters of another animal.

A milk analysis apparatus may be arranged to cooperate with a milk extracting arrangement, for regularly analysing milk samples of the animals, e.g. at or around the moment of a milking session. The milk analysis apparatus may extract a milk sample and provide it on a milk analysis unit such as a dry stick/lateral flow stick/lateral flow test strip or similar. The milk is typically diluted with a diluent, which also may be used to rinse the tubings between test sessions. The diluent may be provided in a liquid container.

However, certain problems may appear when it comes to management of the liquid containers of various milk analysis apparatus, the liquid containers of different milk analysis apparatus on the farm may have to be changed at different points in time as a different amount of samples may be taken on different milk analysis apparatus, leading to an administrative inferno for the farmer. A liquid container may for example be used in a first milk analysis apparatus, while the first milk analysis apparatus is broken. The farmer may then want to use the liquid container of the first milk analysis apparatus in a second milk analysis apparatus at the farm.

However, it is difficult to physically inspect the liquid container to check the amount of remaining diluent as the liquid container is enclosed for protecting the comprised diluent from dust and other contamination from the environment.

It would be desired to find a solution for assisting the farmer in keeping track on the amount of consumed diluent in different liquid containers and to assist him/her in changing them in due time for both avoiding the milk analysis apparatus to run dry from diluent, while at the same time not changing any liquid container too early so that diluent is wasted.

SUMMARY

It is therefore an object of this invention to solve at least some of the above problems and facilitate for a farmer to measure a biomarker value of a milk sample of an animal, and to change liquid container at an appropriate point in time.

A biomarker, or biological marker, generally refers to a measurable indicator of some biological state or condition of the animal. The biomarker value measurement may be associated with pregnancy/reproduction of the animal, health of the animal, and/or quality of the milk of the animal.

According to a first aspect of the invention, this objective is achieved by a control unit of a milk analysis apparatus, in an agricultural environment. The milk analysis apparatus comprises a first wireless communication device, for communication with a memory device of a liquid container. The liquid container is insertable into, or attachable to the milk analysis apparatus. Further, the liquid container comprises a second wireless communication device for communication with the first wireless communication device of the milk analysis apparatus.

The control unit is configured to obtain a signal associated with consumed liquid amount of the liquid container, during a liquid extraction session. Also, the control unit is further configured to transmit information related to the consumed liquid amount via the first wireless communication device, for storage in the memory device of the liquid container.

In a first possible implementation of the control unit according to the first aspect, the control unit may be configured to estimate remaining amount of liquid in the liquid container based on the obtained signal associated with consumed liquid amount; and wherein the transmitted information concerns the estimated remaining amount of liquid in the liquid container.

In a second possible implementation of the control unit according to the first aspect, or according to the first possible implementation thereof, the control unit may be configured to estimate the remaining amount of liquid in the liquid container by obtaining information concerning amount of liquid in the liquid container from the memory device of the liquid container before performing the liquid extraction session. Further, the control unit may also be configured to subtract the amount of liquid extracted from the liquid container during the liquid extraction session, from the obtained amount of liquid in the liquid container.

In a third possible implementation of the control unit according to the first aspect, or according to any previously disclosed possible implementation thereof, the control unit may be configured to obtain the stored remaining amount of liquid in the liquid container, from the memory device of the liquid container, via the first wireless communication device. Further, the control unit may be configured to compare the remaining amount of liquid with a predetermined trigger level. The control unit may also be configured to output an alert, encouraging the agricultural manager to replace the liquid container, when the remaining amount of liquid is lower than or equal to the predetermined trigger level.

In a fourth possible implementation of the control unit according to the first aspect, or according to any previously disclosed possible implementation thereof, the control unit may be configured to detect a first-time liquid extraction from the liquid container. Also, the control unit may be configured to determine a moment in time when the first-time liquid extraction of the liquid container is detected. The control unit may additionally be configured to transmit the determined moment in time to the memory device of the liquid container, via the first wireless communication device, for storage in the memory device of the liquid container.

In a fifth possible implementation of the control unit according to the first aspect, or according to any previously disclosed possible implementation thereof, the control unit may be configured to, at a moment before liquid extraction of the liquid container: determine a current moment in time. The control unit may also be configured to retrieve the moment in time of first-time liquid extraction stored in the memory device of the liquid container, via the first wireless communication device. In addition, the control unit may be further configured to check whether the time difference between the current moment in time and the moment in time of the first-time liquid extraction, exceeds a predetermined time limit. The control unit may in addition be further configured to prohibit liquid extraction from the liquid container when the predetermined time limit is exceeded.

In a sixth possible implementation of the control unit according to the first aspect, or according to any previously disclosed possible implementation thereof, the control unit may be configured to output an alert, encouraging an agricultural manager to change liquid container when the predetermined time limit is exceeded by the time period, via an output device.

In a seventh possible implementation of the control unit according to the first aspect, or according to any previously disclosed possible implementation thereof, the control unit may be configured to activate the first wireless communication device when starting a liquid extraction session of the liquid container, and/or deactivate the first wireless communication device when the information related to the consumed liquid amount has been transmitted.

In an eighth possible implementation of the control unit according to the first aspect, or according to any previously disclosed possible implementation thereof, the milk analysis apparatus comprises a liquid volume determination device; and wherein the signal associated with consumed liquid amount is obtained from the liquid volume determination device.

According to a second aspect of the invention, this objective is achieved by a liquid container, which is insertable into a milk analysis apparatus. The liquid container comprises a memory device and a second wireless communication device, configured for information exchange with a control unit of the milk analysis apparatus. The control unit may be configured according to the first aspect of the invention, or any of the previously disclosed possible implementations thereof. The milk analysis apparatus comprises a first wireless communication device for communication with the second wireless communication device of the liquid container. The information exchange may be performed when the liquid container is inserted into the milk analysis apparatus. The memory device of the liquid container is configured to receive information concerning remaining amount of liquid in the liquid container from the control unit of the milk analysis apparatus, via the second wireless communication device. In addition, the memory device is also configured to store the received information.

In a first possible implementation of the liquid container according to the second aspect, the memory device may be configured to provide information concerning amount of liquid in the liquid container to the control unit, via the second wireless communication device.

In a second possible implementation of the liquid container according to the second aspect, or the first possible implementation thereof, the memory device may be configured to receive information concerning a moment in time of a first-time liquid extraction of the liquid container from the control unit of the milk analysis apparatus, via the second wireless communication device. Also, the memory device of the liquid container may be configured to store the received information.

In a third possible implementation of the liquid container according to the second aspect, or any of the possible implementations thereof, the memory device may be configured to provide stored information concerning the moment in time of the first-time liquid extraction of the liquid container to the control unit, via the second wireless communication device.

In a fourth possible implementation of the liquid container according to the second aspect, or any of the possible implementations thereof, the memory device may be configured to receive a blocking sign prohibiting further usage of the liquid container, from the control unit via the second wireless communication device. Also, the memory device may be configured to store the received blocking sign, thereby prohibiting further usage of the liquid container.

According to a third aspect of the invention, this objective is achieved by a system in an agricultural environment. The system comprises a control unit according to the first aspect, or any of the possible implementations thereof. Further, the system also comprises a liquid container according to the second aspect, or any of the possible implementations thereof. The system in addition comprises a milk analysis apparatus comprising a first wireless communication device, for communication with a memory device of the liquid container. Furthermore, the system comprises a milk extracting arrangement, operating in conjunction with the milk analysis apparatus.

Thereby, by keeping track of the amount of consumed liquid of the liquid container during a liquid extraction session and repeatedly store this information in the memory device of the liquid container, the remaining amount of diluent in the liquid container may be continuously determined by the control unit before performing the next liquid extraction session, also when the liquid container is inserted into another milk analysis apparatus.

It is hereby avoided that a liquid extraction session is initiated with a liquid container being empty or comprising an insufficient amount of diluent for enabling performance of a complete liquid extraction session. Further, measures may be taken to ascertain that a new liquid container is ordered in time and that the liquid container is replaced at the right moment to avoid unnecessary waste of diluent, while not disturbing the planned milk sample testing of the milk analysis apparatus.

Hereby costs, maintenance and work intensity of the farmer associated with management of the milk analysis apparatus is minimised or at least reduced.

Other advantages and additional novel features will become apparent from the subsequent detailed description.

FIGURES

Embodiments of the invention will now be described in further detail with reference to the accompanying figures, in which:

FIG. 3 illustrates a cassette and a liquid container, according to an embodiment.

DETAILED DESCRIPTION

Embodiments of the invention described herein are defined as a control unit and a liquid container, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
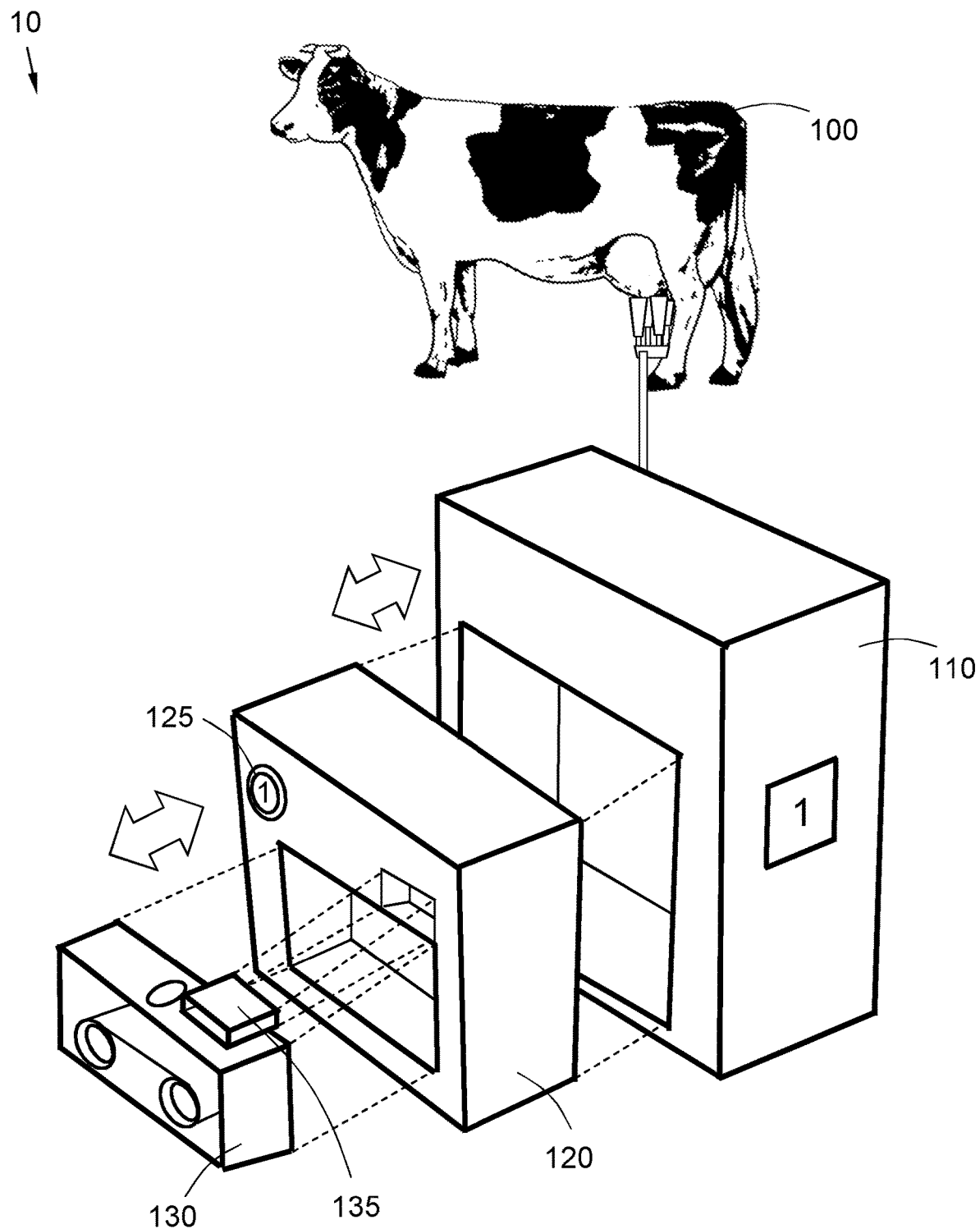
FIG. 1 illustrates an example of an arrangement for measuring a biomarker value of a milk sample of an animal.

FIG. 1 illustrates a scenario with a system 10 for analysing milk of an animal 100 which may be comprised in a herd of dairy animals at a dairy farm.

"Animal" may be any arbitrary type of domesticated female milk producing and/or meat producing mammal such as cow, goat, sheep, horse, camel, primate, dairy buffalo, donkey, yak, etc.

Milk of the animal 100 may be extracted by a milk extracting arrangement 110 such as e.g. a milking robot or other milking arrangement and provided to a milk analysis apparatus 120.

The milk analysis apparatus 120 may be associated with and possibly even releasably insertable into the milk extracting arrangement 110 in some embodiments. Thus, there may be an interface between the milk extracting arrangement 110 and the milk analysis apparatus 120 for providing milk and possibly also electricity via the milk extracting arrangement 110 to the milk analysis apparatus 120.

The milk analysis apparatus 120 comprises various electronics and equipment such as a camera, one or several pumps, a tube element for attachment to the interface to the milk extracting arrangement 110, motors, a communication unit etc. The pumps and the tubings may A cassette 130 may be detachably inserted into the milk analysis apparatus 120. The cassette 130 may comprises a tape or similar corresponding arrangement with milk analysis units such as dry sticks/lateral flow sticks/lateral flow test strips or similar. The milk analysis units are configured to indicate a biomarker value of a milk sample of the animal 100, e.g. indicate progesterone in the milk sample by a lateral flow test.

The cassette 130 may in some embodiments be configured to be detachably inserted in the milk analysis apparatus 120 and held in place by a fastening means such as a snap lock, a magnet, a screw, etc., and a door of the milk analysis apparatus 120 may be closed for enclosing the cassette 130 within the milk analysis apparatus 120, thereby further fixating the cassette 130 in the position.

Also, a liquid container 135 may be detachably insertable into, or associated with (i.e. physically connected to) the milk analysis apparatus 120. The liquid container 135 may comprise a diluent, which may be used to dilute the extracted milk and also, or alternatively, to rinse the tubing, needle, pump etc., of the milk analysis apparatus 120.

Thereby, a milk sample of the animal 100 may be extracted from the animal 100 by the milking equipment and provided via the milk analysis apparatus 120 to one of the milk analysis units on the tape of the cassette 130. The milk analysis units may react on presence and/or amount of one or several biomarkers, e.g. by changing colours, or intensity of a colour. The camera in the milk analysis apparatus 120 may capture an image through an opening of the cassette 130. The captured image of the milk analysis unit may then be analysed by a control unit, and based on the intensity of the colour, presence and/or quantity of the biomarker in the milk sample may thereby be determined.

The measured biomarker may be e.g. progesterone, glycoprotein, oestrogen and/or Gonadatropin-Releasing Hormones, or any other similar biomarker associated with reproduction or health of the animal 100, in different embodiments.

Progesterone is a hormone that regulates several physiological functions of the animal 100. Progesterone may prepare the uterus for pregnancy, maintain the pregnancy if fertilisation occurs, and inhibit the animal 100 from showing signs of standing oestrus and ovulating when pregnant. Progesterone levels, for example, may rise at the beginning of the pregnancy, and be kept at a high level throughout the pregnancy of the animal 100. Progesterone levels in milk samples may be used to monitor pregnancy, oestrous cycles (heat detection) and/or postpartum ovarian activity. For these reasons, progesterone levels of animals 100 at the farm is interesting for the farmer to detect and keep track of.

However, the measured biomarker may in some embodiments comprise LDH (Lactate Dehydrogenase), BHB (Beta-HydroxyButyrat), urea, and/or somatic cell count; or other biomarker related to status of the animal 100. In some embodiments, a plurality of the above enumerated biomarkers may be measured. Alternatively, in some embodiment, the farmer may subscribe to a cassette 130 comprising a certain milk analysis units configured to measure a biomarker, or a set of biomarkers, as selected by the farmer; and/or different cassettes 130 comprising milk analysis units, e.g. on the tape configured to measure different biomarkers, or sets of biomarkers, during different periods of time of the year.

Thus, the milk analysis apparatus 120 comprises several modules such as the cassette 130, the dosing module and/or the liquid container 135, which are to be changed for a new respective module at particular time intervals, which may occur at different moments in time for the different modules; and also for different milk analysis apparatus 120 at the farm, as they may be used with different intensity; or alternatively be synchronised with each other.

The cassette 130 with the milk analysis units is to be exchanged when the milk analysis units have been consumed. However, the number of used milk analysis units will be dependent on how often sampling is made, how many milk analysis units that are used for each animal 100 and/or how many defect milk analysis units there are in the cassette 130. For example, in case the farmer is primarily interested in timing insemination of the animal 100, samples of that animal 100 may be taken only around, or right before, a moment in time when it is predicted that the particular animal 100 is in heat. Animals such as cows and/or heifers typically go into heat or oestrus every 17 to 24 days (in average 21 days), why the next heat could be roughly predicted based on the moment in time of the last heat.

Another farmer may want to take a milk sample on every milking event, e.g. in order to survey health status of a particular animal 100. Also, different cassettes 130 may possibly comprise a different number of milk analysis units. The time period between exchange of the cassettes 130 for different milk analysis apparatuses 120 may thereby be different.

The dosing module comprises one or several pumps, such as hose pumps and a tube element for attachment to the milk extracting arrangement 110. The one or several pumps may be configured to act on the tube element for advancing the milk sample from the milk extracting arrangement 110 through the tube element to a needle. The milk sample may then be diluted with diluent from the liquid container 135 in a mixing chamber of the needle (or possibly in a separate mixing chamber and then provided to the needle), where after the diluted milk sample may be applied from the needle to the milk analysis unit.

The pumps and the tubings of the dosing module 137 are typically made of plastic such as e.g. polyethylene, polypropylene, polyurethane, silicone; rubber, latex or similar material which will age and become fragile over time, also in case the dosing module 137 is not used. Also, milk may clog the tubings and affect the flow through the tubings. The milk may also stimulate aging of the tubings, so that it becomes stiff and fragile. For these reasons, the dosing module 137 may be exchanged for a new one either after a certain time period after first usage of the dosing module 137, a certain time period after production of the dosing module 137 and/or when the pump has pumped a certain amount of milk through the tubings.

The liquid container 135 comprises a diluent to be used as previously described. The liquid container 135 has to be exchanged either when the diluent has been consumed, or after a certain time period exceeding a time threshold limit, when a chemical aging process may has caused the diluent to deteriorate.

The various modules, i.e. the dosing module, the liquid container 135 and/or the cassette 130 may comprise fastening means, e.g. in form of a snap fit arrangement, magnetics, screw joints, etc., arranged to attach the respective module onto the milk analysis apparatus 120.

The modular structure of the provided solution has several advantages. By keeping the arrangement modular in form of the dosing module, the liquid container 135 and the cassette 130, which may be attached to milking equipment of the farm; costs, maintenance and work intensity of the farmer may be minimised or at least reduced. Also, by separating the consumable material such as milk analysis units/measurement sticks of the cassette 130, from elements subject to wear, like the pumps of the dosing module, and the electronics and instruments of the milk analysis apparatus; the liquid container 135 could be continuously replaced with another replacement liquid container 135 e.g. ordered via a courier service or postal office subscription.

The milk analysis apparatus 120 may on the other hand be detached from the milk extracting arrangement 110 and the dosing module/liquid container 135/cassette 130 upon malfunction and sent to a workshop for troubleshooting, repair, maintenance, etc.

Meanwhile, an identical replacement milk analysis apparatus 120 may be provided to the farm, enabling continuous biomarker measurements on the farm, also when the equipment of the milk analysis apparatus 120 is malfunctioning, to which the old dosing module/liquid container 135/cassette 130 could be applied.

Further, the arrangement may be operated by the farmer without requiring a particularly trained technician to come and visit the farm. Instead, the farmer may send the malfunctioning module to the workshop; or just replace it.

By maintaining the diluent, the milk analysis units and the tubings, respectively, in separate modules, they are protected from any possible affection of the environment in the farm.

However, an appearing problem is that it may become problematic for the farmer to keep track on which module to change at which moment in time. It would be desired to find a tool for reminding the farmer of when to change the respective modules, or at least one particular of the modules; and/or to make it impossible to run the milk analysis apparatus 120 with an empty liquid container 135, etc.

Figure 2A:
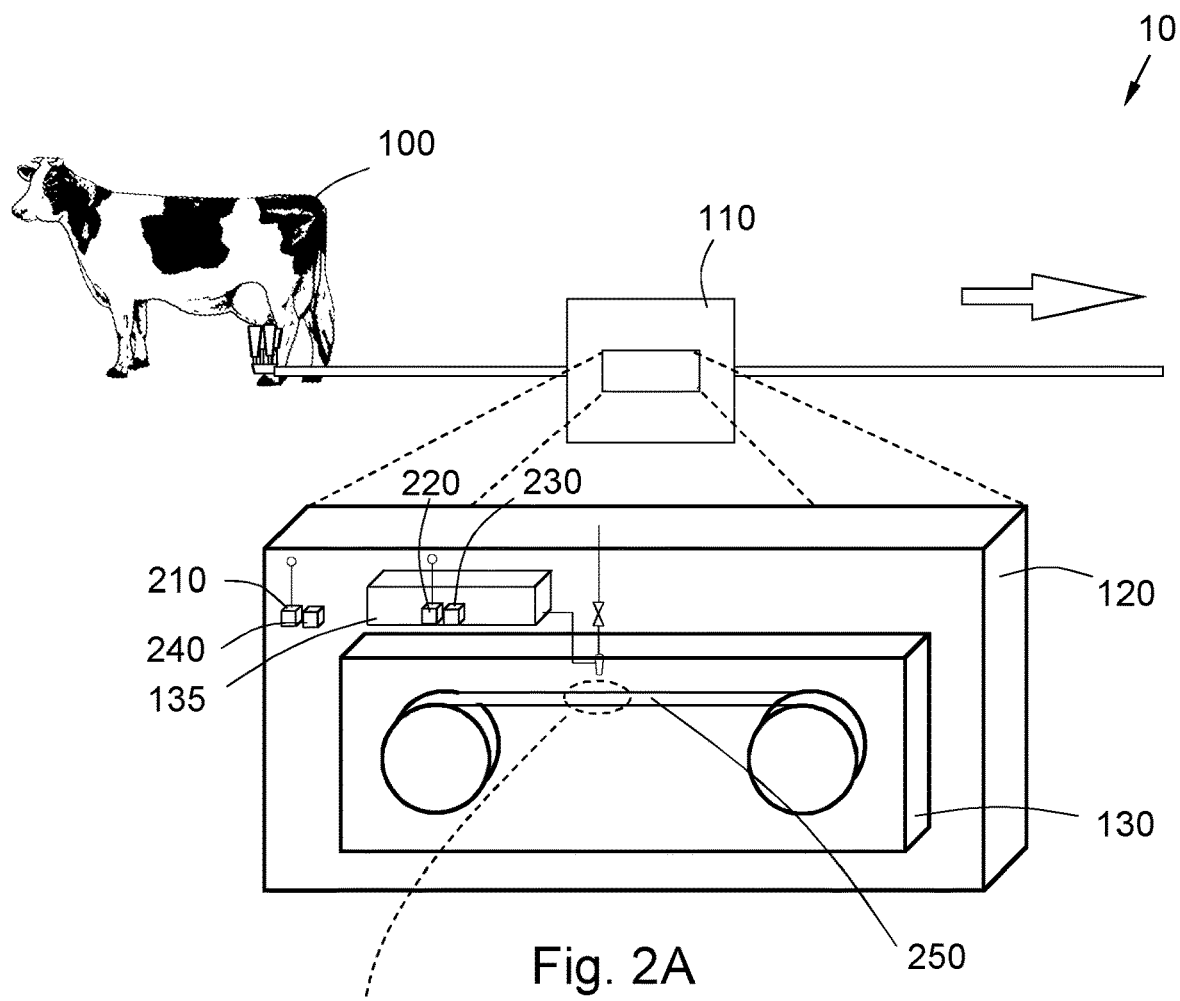
FIG. 2A illustrates a cassette inserted into a milk analysis apparatus, according to an embodiment.

FIG. 1 and FIG. 2A depict general overviews of the environment in which the milk analysis apparatus 120, the cassette 130 and the liquid container 135 according to the provided solution is intended to operate, without going too much into details, in order for the reader to get a rough overview. Sublime examples of details of the tape may be studied in FIG. 2B. FIG. 3 illustrates a particular aspect of the provided solution and a particular solution with regard to the liquid container 135.

Figure 2B:
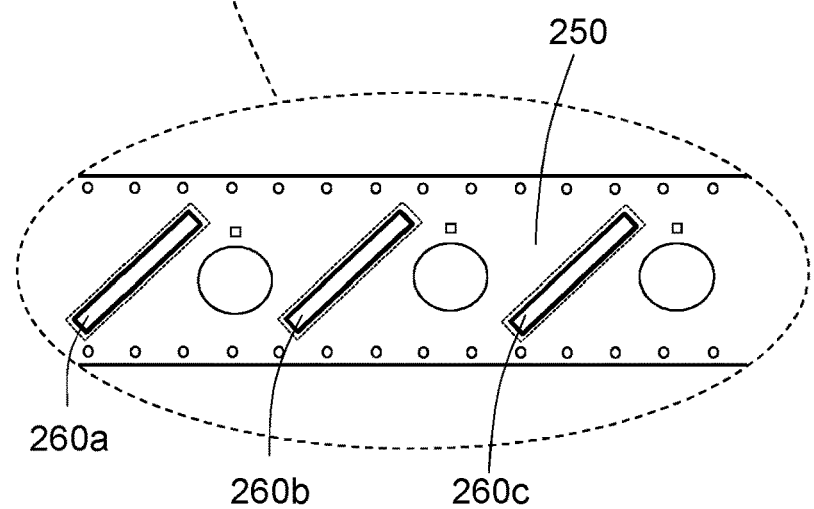
FIG. 2B illustrates a section of a tape comprising dry sticks, according to an embodiment.

FIGS. 2A and 2B illustrates a scenario illustrating a milk analysis apparatus 120, a cassette 130 and a liquid container 135 interacting with each other and with the milk extracting arrangement 110, according to an embodiment.

The milk analysis apparatus 120 may comprise electronics and equipment such as e.g. a camera, a tube element for attachment to the milk extracting arrangement 110, a motor, a communication unit 230, etc., to be used for determining a biometric value of a milk sample received from an animal 100. In some embodiments, one or several pumps and tubings are comprised in the dosing module. The pump/s is configured to act on the tube element for advancing the milk sample from the milk extracting arrangement 110 through the tube element to reach the needle; or the mixing chamber of the needle. The mixing chamber may alternatively be external to the needle. The tube elements are configured to receive the milk sample of the animal 100 via a milk extracting arrangement 110 and provide the milk sample to a needle, i.e. the needle comprised in the dosing module or the mixing chamber of the needle. The mixing chamber may alternatively be external to the needle.

In the illustrated embodiment, the dosing module may comprise a needle for applying the milk sample to a milk analysis unit 260a, 260b, 260c on a tape 250 in the cassette 130 through an opening in the cassette 130. The camera may then align the needle with the milk analysis unit 260a, 260b, 260c on the tape 250 of the cassette 130, in an embodiment. The milk analysis units 260a, 260b, 260c may not necessarily be kept on a tape 250, but other similar solutions may be applied wherein the milk analysis units 260a, 260b, 260c may be maintained on another similar substrate.

The milk analysis apparatus 120 also comprises a first wireless communication device 210 and may comprise a control unit 240 while the liquid container 135 comprises a second wireless communication device 220 and a memory device 230. The control unit 240 may optionally be situated outside of the milk analysis apparatus 120, yet being in communicational contact with the first wireless communication device 210.

The first wireless communication device 210 of the milk analysis apparatus 120 may communicate with the second wireless communication device 220 of the liquid container 135 via a wireless communication interface such as e.g. Near Field Communication (NFC). The control unit 240 of the milk analysis apparatus 120 may thereby obtain information from the liquid container 135, which is stored in the memory device 230 of the liquid container 135 and/or provide information to the memory device 230, for storage therein.

In the illustrated embodiment, the dosing module may comprise a needle for applying the milk sample to a milk analysis unit 260a, 260b, 260c on a tape 250 in the cassette 130 through an opening in the cassette 130. The camera may then align the needle with the milk analysis unit 260a, 260b, 260c on the tape 250 of the cassette 130, in an embodiment. The milk analysis units 260a, 260b, 260c may not necessarily be kept on a tape 250, but other similar solutions may be applied wherein the milk analysis units 260a, 260b, 260c may be maintained on another similar substrate.

The dosing module may also comprise a liquid evacuator or drainage, which may collect liquid that has been output by the needle. The liquid, when comprising merely milk, may be returned back to the milk line in some embodiments. In other embodiments, when the milk has been mixed with diluent, the liquid may be conveyed away from the cassette 130 in order not to soak or contaminate other, unused, milk analysis units 260a, 260b, 260c of the tape 250 on the cassette 130.

The camera may capture an image of the milk analysis unit 260a, 260b, 260c of the carrier tape 250 through the opening, and based on these images, a cassette external motor may adjust the tape 250 for positioning a new milk analysis unit 260a, 260b, 260c, on which a new test is to be made, in relation to the needle.

The milk analysis apparatus 120 may also comprise a communication device which may communicate via a wired or wireless communication interface with an output unit, a data base, a communication device of a farmer, etc.

Such wireless communication interface may comprise, or at least be inspired by wireless communication technology such as Wi-Fi, 3GPP LTE, Bluetooth (BT) to name but a few possible examples of wireless communications in some embodiments.

The control unit 240 may be configured to determine a biomarker value of the milk sample of the animal 100, based on an analysis of the image, captured by the camera. The control unit 240 may be comprised in the milk analysis apparatus 120 in some embodiments; or be external to the milk analysis apparatus 120.

A database may store measured biometric values of the animal 100, associated with an identity reference of the animal 100 and/or a time stamp of the measurement. Other measurements and/or data related to the animal 100 may also be stored in the database, such as milk yield, e.g. measured by the milk flow meter, activity, breed, parity, rumination, lactation, resting, feed intake, energy balance, Days In Milk, milk production, age and possibly other similar animal status related parameters.

When a deviation, exceeding a first threshold limit, is detected between the outcomes of the biomarker measurement and the corresponding reference value, an alert may be outputted to the farmer or other responsible person. The alert may comprise e.g. visual information, an audio message, a tactile signal or a combination thereof, encouraging the farmer to further investigate the reasons for the detected deviation in result. In case a plurality of people is working with the herd, a broadcast may be made to the plurality of farmers and their respective associated output units, in some embodiments.

FIG. 3 illustrates the interaction between the milk analysis apparatus 120, the cassette 130, the liquid container 135 and/or the dosing module.

The milk analysis apparatus 120 comprises a first wireless communication device 210. The first wireless communication device 210 is configured for wireless communication with a second wireless communication device 220 comprised in a liquid container 135. The wireless communication between the devices 210, 220 may be made by e.g. NFC communication, Bluetooth, Radio-Frequency Identification (RFID) or other similar short-range wireless communication.

When producing or refilling the liquid container 135, a representation of the amount of liquid in the liquid container 135 may be stored in the memory device 230 of the liquid container 135, possibly associated with a time code and/or a liquid identifying code.

Different liquid containers 135 may be filled with different amount of diluent; and/or be filled with different types/quality of diluent, in some embodiments. In other embodiments, the amount of diluent in the liquid containers 135 when new/refilled may always be the same and thereby implicit.

A control unit 240 of the milk analysis apparatus 120 is in communicational connection with the first wireless communication device 210. Thereby, the control unit 240 may obtain information stored in the memory device 230 of the liquid container 135 and/or provide information via the wireless communication devices 210, 220 to the memory device 230 for storage therein.

The control unit 240 may also obtain information from other entities comprised in or associated with the milk analysis apparatus 120. The control unit 240 may for example obtain a signal associated with consumed liquid amount of the liquid container 135, during a liquid extraction session from a liquid volume determination device, such as e.g. a pump in the dosing module, or a flow sensor configured to estimate amount of liquid that has passed the tubings.

The control unit 240 may then either forward the amount of extracted liquid to the memory device 230 for storage therein; or alternatively subtract the amount of extracted liquid from the amount of liquid in the liquid container 135 before starting the liquid extraction session and forward the estimated remaining liquid of the liquid container 135 to the memory device 230 for storage therein. In some embodiments, the control unit 240 may be configured to estimate remaining amount of liquid in the liquid container 135 based on the obtained information associated with consumed liquid amount. This information may then be forwarded to and stored within the memory device 230.

It hereby becomes possible to continuously keep track of the consumed amount of liquid, or alternatively: remaining amount of liquid, in the liquid container 135. The farmer may for example take a liquid container 135 which has been partly used in a first milk analysis apparatus 120 and put it into a second milk analysis apparatus 120, and still be assured that the second milk analysis apparatus 120 has knowledge concerning the amount of liquid/diluent in the liquid container 135.

In some embodiments, the control unit 240 may compare the remaining amount of liquid, or alternatively a totally consumed amount of liquid, with a predetermined trigger level. When the predetermined trigger level is exceeded, an alert may be output, encouraging the agricultural manager to replace the liquid container 135, when the remaining amount of liquid is lower than or equal to the predetermined trigger level.

The output unit 310 may be e.g. a cellular mobile telephone, a stationary or portable computing device, a computer tablet, a display, a pair of intelligent glasses, a smart contact lens, an augmented reality device, a smart watch or similar device having a user interface and wireless communication ability.

Via the output unit 310, the agricultural manager or other farmer may take part of the alert to order and/or replace the liquid container 135. Alternatively, a replacement liquid container 135 may be ordered automatically when a first predetermined trigger level is reached, and an encouragement to replace the liquid container 135 may be provided to the agricultural manager via the output unit 310.

It may hereby be assured that the milk analysis apparatus 120 continuously is supplied with diluent via the liquid container 135 and that the liquid container 135 is changed in due time, i.e. neither too late (making the milk samples unreliable or even impossible to perform) or too early (causing unnecessary waste of the diluent).

In yet some embodiments, the control unit 240 may be configured to detect a first-time liquid extraction from the liquid container 135, i.e. when the sealing of the liquid container 135 is broken. Further, the control unit 240 may be configured to determine a moment in time when the first-time liquid extraction of the liquid container 135 is detected. The control unit 240 may then, via the first wireless communication device 210 transmit the determined moment in time to the memory device 230 of the liquid container 135, for storage in the memory device 230 of the liquid container 135.

By determining and storing the moment in time when the liquid container 135 is used for the first time, it becomes possible to later determine when the liquid container 135 was used for the first time, also when inserted in another milk analysis apparatus 120.

In some embodiments, the control unit 240 may perform a check to this issue at a moment before performing liquid extraction of the liquid container 135. The control unit 240 may thus determine a current moment in time, based on a watch or time determining service. Further, the control unit 240 may retrieve the moment in time of first-time liquid extraction stored in the memory device 230 of the liquid container 135, via the first wireless communication device 210. Also, the control unit 240 may check whether the time difference between the current moment in time and the moment in time of the first-time liquid extraction, exceeds a predetermined time limit. In addition, the control unit 240 may prohibit liquid extraction from the liquid container 135 when the predetermined time limit is exceeded.

The prohibition of the liquid extraction from the liquid container 135 may be realised by generating a blocking sign prohibiting further usage of the liquid container 135 and provide it to the memory device 230 of the liquid container 135 via the first wireless communication device 210, for storage in the memory device 230. Thereby, liquid extraction of the liquid container 135 may be prohibited, also when inserted into another milk analysis apparatus 120. The control unit 240 of the milk analysis apparatus 120 may be configured to check the memory 230 of the liquid container 135 before initiating any liquid extraction session involving the liquid container 135.

It could thereby be avoided that a liquid container 135 which has been opened for too long time, i.e. exceeding the time threshold limit, is used in the milk analysis apparatus 120. The diluent of a liquid container 135 which has been open for too long may deteriorate due to chemical aging processes and may thereby affect the reliability of the biomarker measurement.

The control unit 240 may in some embodiments also output an alert, encouraging an agricultural manager to change liquid container 135 when the predetermined time limit is exceeded by the time period, via an output device 310.

The agricultural manager is hereby alerted about the situation and could exchange the liquid container 135 for a new one, leading to that no test events are missed.

The control unit 240 may furthermore be configured to activate the first wireless communication device 210 when starting a liquid extraction session of the liquid container 135, or there about and/or deactivate the first wireless communication device 210 when the information related to the consumed liquid amount has been transmitted.

It thereby becomes possible to keep the wireless communication devices 210, 220 active for as brief period of time as possible. Thereby, transmission disturbance on other wireless communication devices close-by is avoided or at least reduced.

The embodiments, or parts thereof, illustrated in FIG. 1, FIG. 2A, FIG. 2B, and/or FIG. 3 may with advantage be combined with each other for achieving further benefits.

The terminology used in the description of the embodiments as illustrated in the accompanying drawings is not intended to be limiting of the described control unit 240, liquid container 135, milk analysis apparatus 120 and/or system 10. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

The invention claimed is:

1. A system (10) comprising:
a milk analysis apparatus (120) comprising a first wireless communication device (210) and a control unit (240);
a liquid container (135);
a milk extracting arrangement (110) operating in conjunction with the milk analysis apparatus (120) to extract milk from a dairy animal,
wherein the liquid container (135) is insertable into the milk analysis apparatus (120),
the liquid container comprising a memory device (230) and a second wireless communication device (220) configured for information exchange with the control unit (240) of the milk analysis apparatus (120) when the liquid container (135) is inserted into the milk analysis apparatus (120),
wherein the memory device (230) is configured to receive information concerning a remaining amount of liquid in the liquid container (135) from the control unit (240) of the milk analysis apparatus (120), via the second wireless communication device (220), and store the received information,
wherein the milk analysis apparatus (120) is comprised of the first wireless communication device (210) for communication with the memory device (230) of the liquid container (135) via the second wireless communication device (220) comprised in the liquid container (135), and
wherein the control unit (240) is configured to:
obtain a signal associated with a consumed liquid amount of the liquid container (135), during a liquid extraction session; and
transmit information related to the consumed liquid amount via the first wireless communication device (210), for storage in the memory device (230) of the liquid container (135).

2. The system of claim 1, wherein the control unit (240) is configured to:
estimate a remaining amount of liquid in the liquid container (135) based on the obtained signal associated with the consumed liquid amount, and
wherein the transmitted information concerns the estimated remaining amount of liquid in the liquid container (135).

3. The system of claim 2, wherein the control unit (240) is configured to estimate the remaining amount of liquid in the liquid container (135) by:
obtaining information concerning amount of liquid in the liquid container (135) from the memory device (230) of the liquid container (135) before performing the liquid extraction session; and subtracting the amount of liquid extracted from the liquid container (135) during the liquid extraction session, from the obtained amount of liquid in the liquid container (135).

4. The system of claim 1, wherein control unit (240) is configured to:
obtain, via the first wireless communication device (210), a stored remaining amount of liquid in the liquid container (135) from the memory device (230) of the liquid container (135);
compare the remaining amount of liquid with a predetermined trigger level; and
output an alert, encouraging an agricultural manager to replace the liquid container (135), when the remaining amount of liquid is lower than or equal to the predetermined trigger level.

5. The system according to claim 1, wherein the control unit (240) is configured to:
detect a first-time liquid extraction from the liquid container (135),
determine a moment in time when the first-time liquid extraction of the liquid container (135) is detected, and
transmit the determined moment in time to the memory device (230) of the liquid container (135), via the first wireless communication device (210), for storage in the memory device (230) of the liquid container (135).

6. The system of claim 5, wherein the control unit (240) is configured to, at a moment before liquid extraction of the liquid container (135):
determine a current moment in time,
retrieve, via the first wireless communication device (210), the moment in time of first-time liquid extraction stored in the memory device (230) of the liquid container (135),
check whether a time difference between the current moment in time and the moment in time of the first-time liquid extraction exceeds a predetermined time limit, and
prohibit liquid extraction from the liquid container (135) when the predetermined time limit is exceeded.

7. The system of claim 6, further comprising an output device,
wherein the control unit (240) is configured to:
output an alert, via the output device, encouraging an agricultural manager to change the liquid container (135) when the predetermined time limit is exceeded.

8. The system of claim 1, wherein the control unit (240) is further configured to:
activate the first wireless communication device (210) when starting the liquid extraction session, and
deactivate the first wireless communication device (210) when the information related to the consumed liquid amount has been transmitted.

9. The system of claim 1,
wherein the milk analysis apparatus (120) comprises a liquid volume determination device; and
wherein the signal associated with consumed liquid amount is obtained from the liquid volume determination device.

10. The system of claim 1, wherein the memory device (230) is configured to:
provide information concerning amount of liquid in the liquid container (135) to the control unit (240), via the second wireless communication device (220).

11. The system of claim 1, wherein the memory device (230) is configured to:

receive information concerning a moment in time of a first-time liquid extraction of the liquid container (135) from the control unit (240) of the milk analysis apparatus (120), via the second wireless communication device (220), and store the received information concerning the moment in time of a first-time liquid extraction of the liquid container (135).

12. The system of claim 11, wherein the memory device (230) is configured to:
provide stored information concerning the moment in time of the first-time liquid extraction of the liquid container (135) to the control unit (240), via the second wireless communication device (220).

13. The system of claim 11, wherein the memory device (230) is configured to:
receive a blocking sign prohibiting further usage of the liquid container (135), from the control unit (240) via the second wireless communication device (220); and
store the received blocking sign, thereby prohibiting further usage of the liquid container (135).

* * * * *